United States Patent [19]
Kubach

[11] 3,889,289
[45] June 10, 1975

[54] METHOD AND APPARATUS FOR RECORDING PULSES REPRESENTING POWER OUTAGES OF GREATER THAN A PREDETERMINED DURATION ON A TIMING TRACK OF A BILLING TAPE RECORDER

[75] Inventor: Reinhold W. Kubach, Dayton, Ohio

[73] Assignee: Dayton Electronic Products Company, Dayton, Ohio

[22] Filed: Mar. 29, 1974

[21] Appl. No.: 456,273

[52] U.S. Cl. .................. 360/6; 324/113; 340/253 C; 360/5; 360/38; 360/39

[51] Int. Cl. ..... G11b 5/00; G11b 5/09; G01r 13/16

[58] Field of Search ........... 360/5, 6, 61, 69, 38, 39; 324/113; 340/253 C, 248 B; 346/33 M

[56] References Cited

UNITED STATES PATENTS

| | | | |
|---|---|---|---|
| 3,334,194 | 8/1967 | Chang | 360/61 |
| 3,428,762 | 2/1969 | Geddes | 360/61 |
| 3,500,431 | 3/1970 | Baskin | 360/6 |
| 3,673,607 | 6/1972 | Hoeffel | 360/6 |

*Primary Examiner*—Bernard Konick
*Assistant Examiner*—Jay P. Lucas
*Attorney, Agent, or Firm*—Biebel, French & Bugg

[57] ABSTRACT

A method of recording the occurrence of power outage conditions exceeding a predetermined time on the timing track of a magnetic tape of a billing tape recorder includes the steps of maintaining the current through the time track recording head for said predetermined time, thereafter terminating the flow of current through the recording head, and inhibiting the return of recording head current after power is returned, if the power outage exceeds a predetermined time, sufficient for the tape drive to move the tape a distance equal to at least the gap width of the recording head. The apparatus for accomplishing this includes a capacitor having a capacitance sufficient to supply recording head current for at least the predetermined time period, switch means located between the capacitor and the recording head, and means for opening said switch means after said predetermined time period to remove recording head current and, upon return of power, to close said switch means and thereby cause current to flow through said recording head only after a period of time has elapsed sufficient to permit the tape drive to move the recording tape a distance at least equal to one gap width of the recording head.

6 Claims, 2 Drawing Figures

METHOD AND APPARATUS FOR RECORDING PULSES REPRESENTING POWER OUTAGES OF GREATER THAN A PREDETERMINED DURATION ON A TIMING TRACK OF A BILLING TAPE RECORDER

BACKGROUND OF THE INVENTION

This invention relates to a method and apparatus for recording on the time track of a billing tape recorder a pulse identifying a power outage condition which exists for more than a predetermined length of time.

This invention is used primarily with power consumption measuring devices, and may be used with the recording devices described in U.S. Pat. Nos. 3,148,329 and 3,673,607. In those devices, a magnetic tape is used to record power consumption with respect to some time interval. The magnetic tape customarily has a track devoted to recording time pulses, and at least one, and usually three other tracks for recording pulses representing the measured parameter, such as kilowatt hours, KVA, or current squared.

In a typical installation, the magnetic tape moves past the recording heads at approximately 7 to 12 inches per hour, and timing marks are recorded on the tape at 15, 30, or 60 minute intervals, depending on the specifications of the power company utilizing this equipment. In a typical installation, timing pulses are created at 15 minute intervals thus providing 2880 intervals of 15 minutes each in a 30 day recording period. The data pulses representing the measured parameter are recorded at a much higher rate, typically at a maximum rate of 6,000 pulses per hour. Both the timing and data pulses are recorded in the non-return-to-zero mode, that is, current flows through the recording heads continuously in either the forward or reverse direction.

The data is recorded on the magnetic tape on a real time basis, and the recording mechanisms are specifically designed to tell the operator of the equipment the proper time to insert a tape cartridge and are provided with a clock to permit the operator to record the actual time the tape is installed. Subsequent timing pulses will then be related to that starting time until the tape is eventually removed from the recorder, usually after a 30 day period.

The number of data pulses occurring in the interval between timing pulses is detected during the translation operation, that is, when the data on the tape is scanned after its removal from the recorder. The data may be read during the rewinding operation, as described in U.S. Pat. No. 3,678,484. The information on the tape is sent to a computer which may provide a readout of the total number of time intervals recorded on the magnetic tape, the total number of pulses for each data track, and the time interval identified where the maximum number of pulses occurred. The computer may also search for the three time intervals in which the highest pulse count per interval is noted.

The billing rates to a consumer are based on its power usage with respect to the time of day, and if for some reason, erroneous time pulses were recorded, the interval count would be seriously affected and might possibly distort the customer's usage or demand profile with a consequential error in the customer's monthly bill.

One source of erroneous time pulses are due to power outages. For example, it is possible that a momentary line voltage dip may result in a pulse being placed on the tape which, on fast playback, may generate a sufficient signal to be interpreted by the translator as a time pulse. As previously stated, the time pulses are recorded in the non-return-to-zero mode; however, a momentary power outage would cause the current in the recording head to go to zero momentarily and then return to its normal current flow; therefore, there is a change of flux on the tape which might be detected as a time pulse during playback.

Most utilities are interested in obtaining a true power outage indication, and their computers are programmed to establish the true interval count in the presence of a power outage pulse. It is important, however, to establish what constitutes a power outage. In one example, the power company specified that any power outage which is less than 1.0 second should not be recognized as a power outage, but any outage exceeding this time should be recorded as a pulse on the time track.

When a power outage condition occurs, one of the following events can take place: (1) The capstan motor will coast to a stop while the recording head current decays to and reaches a zero value. This will change the flux density in the recording head gap with a resulting change in particle orientation on the tape. Depending on the amplitude of the induced voltage during playback, this may be detected as a time pulse. (2) The capstan motor will stop the tape before the recording head current decays to zero. In this example, there will be no history left on the tape when power returns. The time switches within the recording equipment have a built-in memory to complete the time interval after the return of power from the position it was when the power outage occurred. (3) No false pulse is recorded on the tape when the power returns because the recording head current reaches a steady state condition before the capstan motor and tape moves far enough to permit a significant change in flux to be recorded on the tape.

In one prior art device, a high inertia capstan drive and fast decaying recording head current are used to generate a power outage pulse, as described in Example 1 above. There are several variables in this system which are hard to control, however, such as friction in the mechanism which will affect the time it takes for the motor shaft to come to a stop, thus making uncertain the predictability of the units in production. Also, this system has no provision for ignoring any power outage of less than a predetermined time (e.g., 1 second) in duration.

SUMMARY OF THE INVENTION

This invention relates to a method and apparatus for recording power outages of greater than a predetermined duration on a time track of a billing tape recorder. More particularly, the invention includes means for maintaining for a predetermined period of time, the current through the recording head for the time track, and, if the power outage exceeds a predetermined length of time, means are included for preventing the recording head current from flowing until after the tape has moved a distance at least equal to one width of the recording head gap.

In the present invention, a power outage will cause the tape motor to cease operating, and the tape will come to rest; but by maintaining the current through the recording head for a predetermined time, e.g., 1 second, depending upon power company requirements, no history will be left on the tape if the power returns and the tape resumes movement within this time period. If the power is interrupted for more than the predetermined time period, then means are included to delay the return of current through the timing track recording head until after the power has remained on long enough for the tape motor to restart and the tape to move through a distance equal to at least one width of the recording head gap. These delays are predictable and repeatable over widely varying operating conditions, thus making the apparatus suitable for production units.

Accordingly, it is an object of this invention to provide a method of recording the occurrence of power outages exceeding a predetermined time on the timing track of a magnetic tape by maintaining the current through the recording head for said predetermined time, and by inhibiting the return of recording head current after power is returned, if the power outage exceeds said predetermined time, sufficient for the tape to move a distance equal to at least the gap width of the recording head; and to provide an apparatus for performing this method.

Other objects and advantages of the invention will be apparent from the following description, the accompanying drawings and the appended claims.

BRIEF DESCRIPTION OF THE DRAWINGS

FIG. 1A represents operation under normal operating conditions; FIG. 1B shows a momentary power outage condition lasting for less than a predetermined period of time; and FIG. 1C shows a power outage condition lasting longer than a predetermined period of time.

DESCRIPTION OF THE PREFERRED EMBODIMENT

Figure 1:
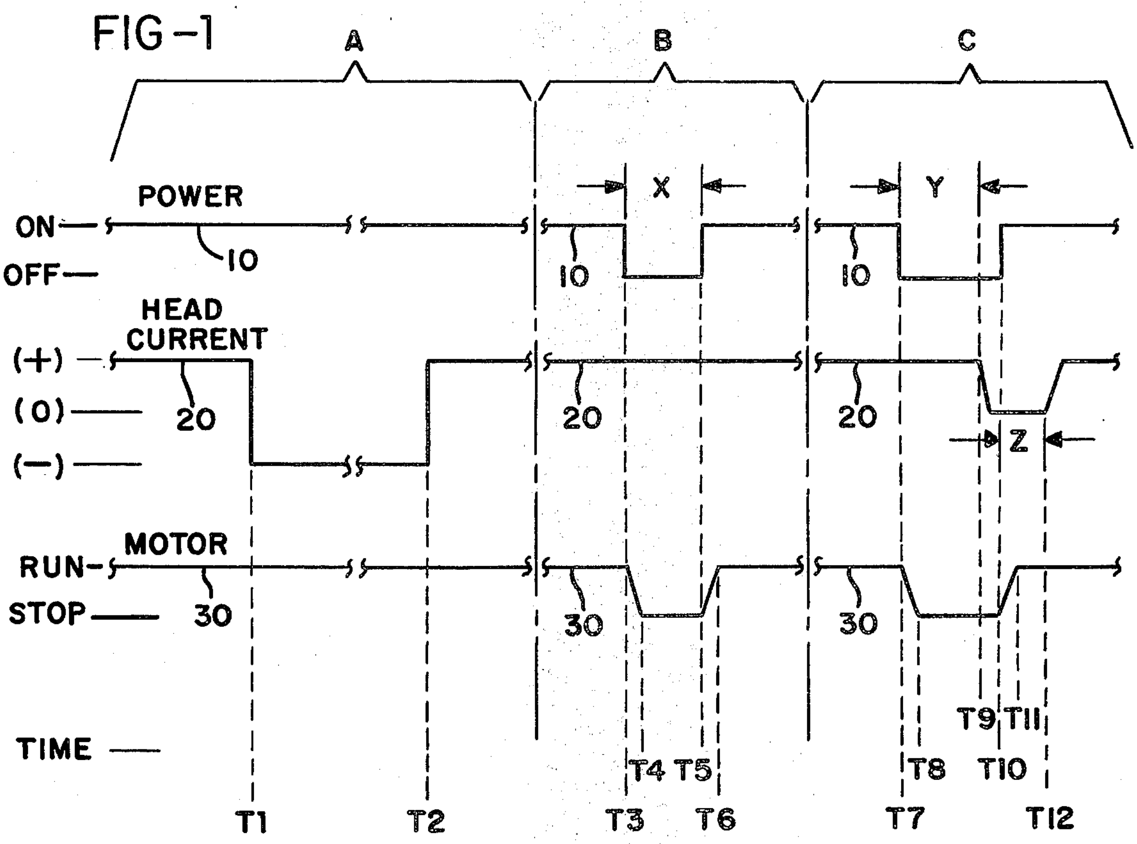
FIG. 1 is a set of waveforms representing, with respect to time, power, recording head current for the timing track, and motor speed.

Reference is now made to the drawings which show a preferred embodiment of the invention, and particularly to FIG. 1 which is a set of waveforms representing, with respect to time, power to the recording instrument, current through the recording head for the timing track, and the speed of the motor which moves the recording tape past the heads.

Referring to FIG. 1A, power is represented by line 10, and it is assumed in this analysis that power is either on or off.

Current through the recording head for the timing track is represented by line 20 and flows either in the forward (+) or reverse (−) direction. In FIG. 1A, recording head current changes from a forward direction to a reverse direction at time T1, and from the reverse to the forward direction at time T2 (non-return-to-zero mode). The interval between T1 and T2 represents closure of the time switch, usually in the order of one minute in duration. The spacing between the leading edges T1 of the time pulses may be 15, 30 or 60 minutes or some other time interval as determined by power company requirements.

Motor speed between "run" and "stop" is represented by line 30.

Referring now to FIG. 1B, a momentary power outage condition lasting less than a predetermined period of time will be described. The power line voltage 10 transistions from an "on" to an "off" condition at time T3; the motor speed 30 decreasess at time T3 and the motor stops at time T4. The power returns to an "on" condition at time T5, and the motor accelerates and reaches its full speed at time T6.

Since the time interval X between T3 and T5 is less than the predetermined period of time established by the power company to indicate a power outage condition, the head current 20 will be maintained by means to be described later in either the forward or reverse direction, depending on the position of the time switch, throughout the momentary power outage condition. In this example, no pulse is recorded on the time track of the tape since current through the recording head is continuous.

FIG. 1C illustrates a power outage condition, the duration of which is greater than a predetermined period of time (Y) established by the power company. Power failure occurs at time T7, the motor decelerates and stops at time T8. At T9, after the predetermined period of time Y has elapsed, the recording head current 20 decreases to a zero value.

The return to full power is indicated at time T10, and the motor accelerates to full speed at time T11. After the motor has run for a period of time (Z) sufficient to move the tape a distance at least the distance of the gap width of the recording head, the recording head current is returned, as at T12.

Thus, for those power outage conditions exceeding the predetermined time Y, the magnetic tape will record a change in the orientation of the magnetic field, and while this change is only from zero to forward (or reverse) current, not the entire excursion of current available when operating normally, the change is nevertheless sufficient to enable the power company to determine that a power outage existed.

Figure 2:
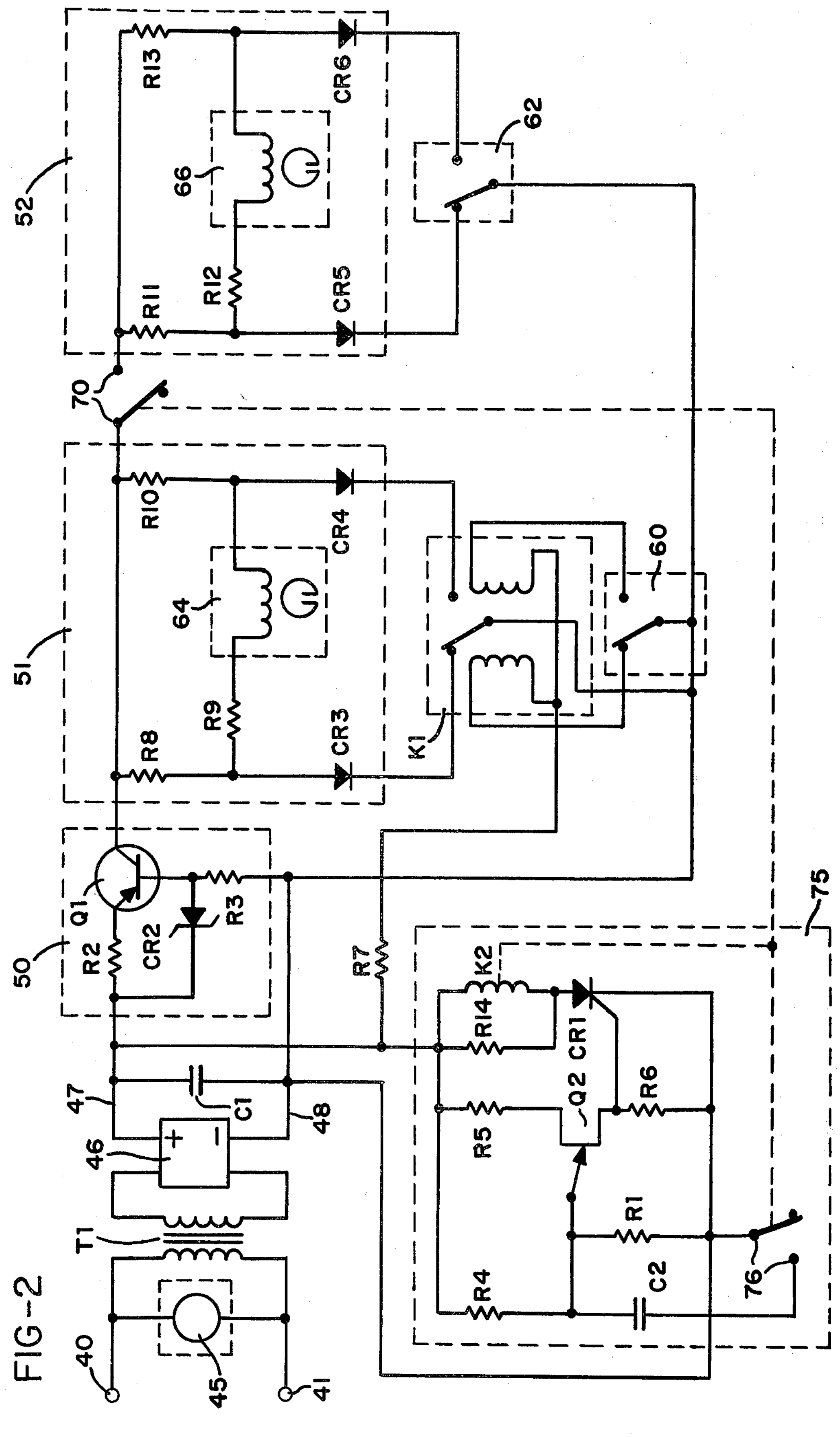
FIG. 2 is an electrical schematic diagram of an apparatus constructed according to this invention.

Reference is now made to FIG. 2, an electrical schematic diagram of a billing tape recorder incorporating the power outage sensor of this invention. Transformer T1 has its primary winding connected to a conventional source of power through connectors 40 and 41. Also connected to a source of power is a timer motor 45. The secondary winding of transformer T1 is connected to a diode bridge module 46, the output of which on lines 47 and 48 is a direct current voltage which is applied to a filter capacitor C1.

A constant current device 50 is connected to the output of the power supply and provides a constant current to the recording circuits shown generally at 51 and 52. The constant current device 50 includes transistor Q1, resistors R2 and R3 and Zener diode CR2. An unregulated supply of current is provided on line 53 through resistor R7 to the solenoids of reed relay K1.

Recording circuit 51 is representative of one or more circuits which may be used to record a measured parameter. Recording circuit 52 is for recording the time pulses. Recording circuit 51 is controlled by a single-pole double-throw switch 60, and this switch is activated from one position to another at a rate representing the measured parameter, such as kilowatt hours, current squared, etc. Recording circuit 52 is controlled by switch 62 which is actuated from one position to another by operation of the timer motor 45. Depending on the position of switches 60 and 62, current will flow through the recording heads 64 and 66, respectively, in one direction or the other in the non-return-to-zero mode of operation.

Power is provided to the recording circuit for the time pulses through normally open contacts 70 of relay K2. This relay serves to prevent recording head current from flowing upon the resumption of power until sufficient time has elapsed for the tape to move at least the distance of the recording head gap; this delay is provided by delay circuit 75.

The energy stored in capacitor C1 is sufficient to keep current flowing in the recording heads 64 and 66 after the motor moving the recording tape has stopped following interruption of power. If the line voltage is interrupted for longer than a predetermined period of time, depending upon the value of capacitor C1, the circuit 75 becomes relaxed and deactivates relay K2.

When line voltage returns, the motor will start and will begin moving the recording tape. Simultaneously with the return of power, the electrical circuits shown in FIG. 2 will be energized, except for the recording circuit 52 for the time channel which remains disconnected by operation of the relay K2.

Relay K2 is energized by operation of CR1 after a predetermined time delay as determined by resistor R4 and capacitor C2. After the power returns, capacitor C2 charges through resistor R4, and when the voltage on C2 increases to a fixed value, unijunction transistor Q2 will fire and generate a trigger pulse on the gate electrode of CR1. Once CR1 begins conducting, relay K2 will energize and remain energized until the power fails again since CR1 will remain in condution once fired. Those skilled in the art will recognize that transistor Q2, resistor R4 and capacitor C2 form a relaxation oscillator, and this oscillator would continue to operate except for the contacts 76 of relay K2 which are used to bias transistor Q2 in the nonconducting state once K2 is energized.

Other means for delaying the application of power to the timing circuit will be recognized by those skilled in the art, such as a one shot multivibrator or other similar timing circuits and the use of solid state switching devices (i.e., transmission gates) for relay K2.

Typical values of the components described in the specification and in FIG. 2 of the drawings are as follows:

| | |
|---|---|
| R1 | 100 ohms |
| R2 | 1K ohms |
| R3 | 3.3K ohms |
| R4 | 20K ohms |
| R5 | 1k ohms |
| R6 | 56 ohms |
| R7 | 820 ohms |
| R8 | 4.7K ohms |
| R9 | 220 ohms |
| R10 | 4.7K ohms |
| R11 | 4.7K ohms |
| R12 | 220 ohms |
| R13 | 4.7K ohms |
| C1 | 1100 $\mu f$ |
| C2 | 50 $\mu f$ |
| CR1 | 2N5062 |
| CR2 | 1N4740 |
| CR3–CR6 | 1N4005 |
| Q1 | 2N5366 |
| Q2 | 2N2646 |
| Motor 45 | 4 RPH |
| Diode Bridge 46 | VARO type VE-27 |

While the method herein described, and the form of apparatus for carrying this method into effect, constitute a preferred embodiment of the invention, it is to be understood that the invention is not limited to this precise method and form of apparatus, and that changes may be made in either without departing from the scope of the invention which is defined in the appended claims.

What is claimed is:

1. A method for recording a pulse on a magnetic tape in response to a power outage condition exceeding a predetermined time interval comprising the steps of maintaining current flow through a recording head associated with said magnetic tape after a power outage for said predetermined time interval, thereafter terminating current flow through the recording head, and inhibiting the resumption of recording head current for a period of time sufficient for said tape to move a distance at least equal to the gap width of the recording head upon the return to power.

2. In a tape recorder apparatus for recording pulses on a magnetic tape representing a power outage condition exceeding a predetermined time interval including recording head means for recording pulses on at least one track of said tape, and motor means connected to a source of power for moving the tape past the recording head, the improvement comprising means for maintaining the flow of current through said recording head for a predetermined period of time following a power outage condition, and means for inhibiting the flow of current through said recording head for a period of time sufficient to permit said motor to move the tape past said recording head means a distance at least equal to one gap width after power resumes.

3. The tape recorder apparatus of claim 2 wherein said means for maintaining current through said recording head for a predetermined period of time includes a capacitor connected to said source of power and capable of providing sufficient current to said recording head means for at least said predetermined period of time, switch means between said capacitor and said recording head, and means responsive to a power outage to open said switch means after said predetermined period of time.

4. The tape recorder apparatus of claim 3 wherein said means for inhibiting said flow of current through said recording head includes a resistor-capacitor time delay circuit, voltage sensing means connected to said resistor-capacitor circuit for sensing the voltage thereacross, said voltage sensing means causing said switch means to close to cause current again to flow through said recording head means after a time period has elapsed sufficient for said motor to move the tape a distance of at least one gap width past said recording head means.

5. The tape recorder apparatus of claim 2 wherein said recording head means is for recording time pulses on said magnetic tape, said apparatus further including means for reversing momentarily the flow of current through said recording head means at regular intervals.

6. A billing tape recorder for recording energy consumption on a magnetic tape including recording head means for recording data pulses representing a variable quantity on at least one track of said tape, recording head means for recording time pulses on a timing track of said tape, means for moving said magnetic tape past said recording head means, means responsive to a power outage condition exceeding a predetermined time interval for recording a pulse on said time track of said tape, said means including means for maintaining current flow through said time track recording head means for a predetermined period of time following said power outage condition, and means for inhibiting current flow through said time track recording head after said predetermined time period has elapsed for a period of time sufficient to permit said tape to move a distance at least equal to one gap width of said time track recording head means following the return of power.

* * * * *